United States Patent
Guidash et al.

(10) Patent No.: US 10,306,169 B2
(45) Date of Patent: May 28, 2019

(54) IMAGE SENSOR WITH OVERSAMPLED COLUMN OUTPUT

(71) Applicant: Rambus Inc., Sunnyvale, CA (US)

(72) Inventors: Michael Guidash, Rochester, NY (US); Craig M. Smith, Spencerport, NY (US); Jay Endsley, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 410 days.

(21) Appl. No.: 15/013,927

(22) Filed: Feb. 2, 2016

(65) Prior Publication Data

US 2016/0234447 A1 Aug. 11, 2016

Related U.S. Application Data

(60) Provisional application No. 62/171,714, filed on Jun. 5, 2015, provisional application No. 62/112,738, filed on Feb. 6, 2015.

(51) Int. Cl.
*H04N 5/378* (2011.01)

(52) U.S. Cl.
CPC .................................. *H04N 5/378* (2013.01)

(58) Field of Classification Search
CPC ..................................................... H04N 5/378
See application file for complete search history.

(56) References Cited

U.S. PATENT DOCUMENTS

| | | | | |
|---|---|---|---|---|
| 4,679,176 A * | 7/1987 | Ogawa | ................. | G10K 11/346 367/103 |
| 5,148,167 A * | 9/1992 | Ribner | ................. | H03M 3/414 341/143 |
| 5,930,735 A * | 7/1999 | Pun | ................. | G01R 31/31921 702/119 |
| 5,943,290 A * | 8/1999 | Robinson | ............. | G11C 27/024 341/122 |
| 6,125,077 A * | 9/2000 | Robinson | ............. | G11C 11/417 365/233.1 |
| 6,208,279 B1 * | 3/2001 | Oprescu | ................ | H03M 3/374 341/143 |
| 6,670,904 B1 | 12/2003 | Yakovlev | | |
| 7,012,557 B2 | 3/2006 | Takayanagi et al. | | |
| 7,924,207 B2 | 4/2011 | Snoeij et al. | | |
| 8,492,697 B2 | 7/2013 | Neubauer et al. | | |
| 2011/0292261 A1 | 12/2011 | Hwang et al. | | |
| 2012/0025903 A1 * | 2/2012 | Foote | ................. | H03M 1/1245 327/552 |

(Continued)

OTHER PUBLICATIONS

Fang, Xiang et al., "CMOS 12 bits 50kS/s Micropower SAR and Dual-Slope Hybrid ADC", 52nd IEEE International Midwest Symposium on Circuits and Systems, Aug. 2-5, 2009, pp. 180-183. 4 pages.

(Continued)

*Primary Examiner* — Antoinette T Spinks
(74) *Attorney, Agent, or Firm* — Charles Shemwell

(57) ABSTRACT

A pixel in an integrated-circuit image sensor is enabled to output, throughout a sampling interval, an analog signal having an amplitude dependent, at least in part, on photocharge integrated within a photosensitive element of the pixel. A plurality of samples of the analog signal are generated during an initial portion of the sampling interval that is shorter than a settling time for a maximum possible level of the analog signal.

20 Claims, 6 Drawing Sheets

(56) References Cited

U.S. PATENT DOCUMENTS

| | | |
|---|---|---|
| 2012/0161998 A1 | 6/2012 | Burm et al. |
| 2012/0286980 A1 | 11/2012 | Park et al. |
| 2012/0287316 A1 | 11/2012 | Kim et al. |
| 2013/0155282 A1* | 6/2013 | Golding ............ H01L 27/14609 348/231.99 |
| 2014/0008515 A1 | 1/2014 | Wang et al. |
| 2014/0246562 A1 | 9/2014 | Van Blerkom |
| 2015/0008308 A1 | 1/2015 | Huang et al. |

OTHER PUBLICATIONS

Snoeij, M.F. et al, "A CMOS image Sensor with a Column-Level Multiple-Ramp Single-Slope ADC", 2007 IEEE International Solid-State Circuits Conference, ISSCC 2007, pp. 506-507, 618. 3 pages.

* cited by examiner

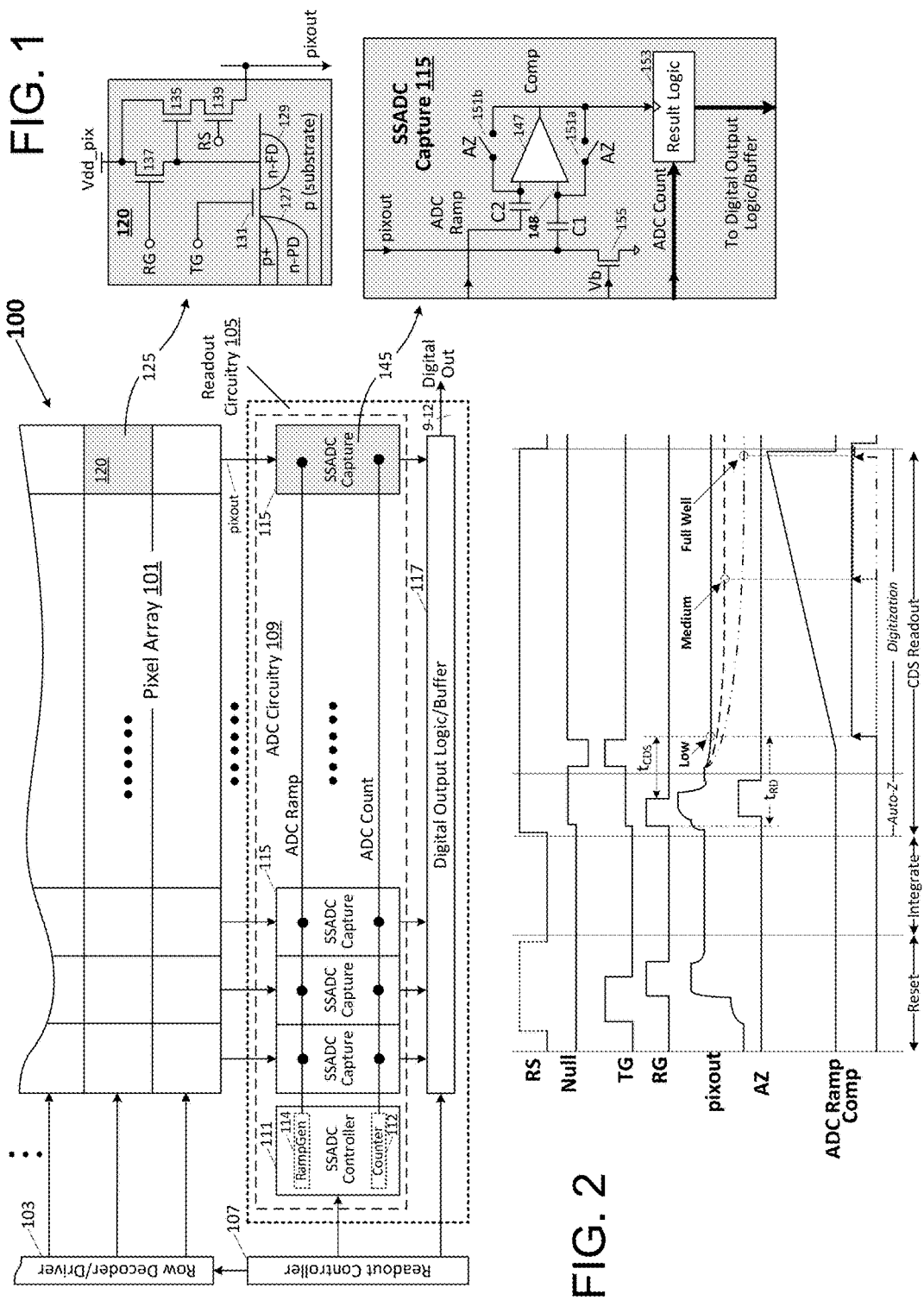

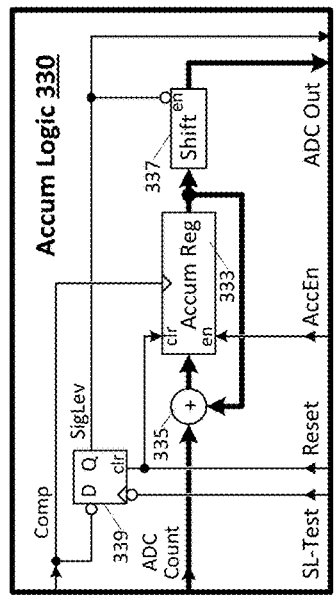
FIG. 7
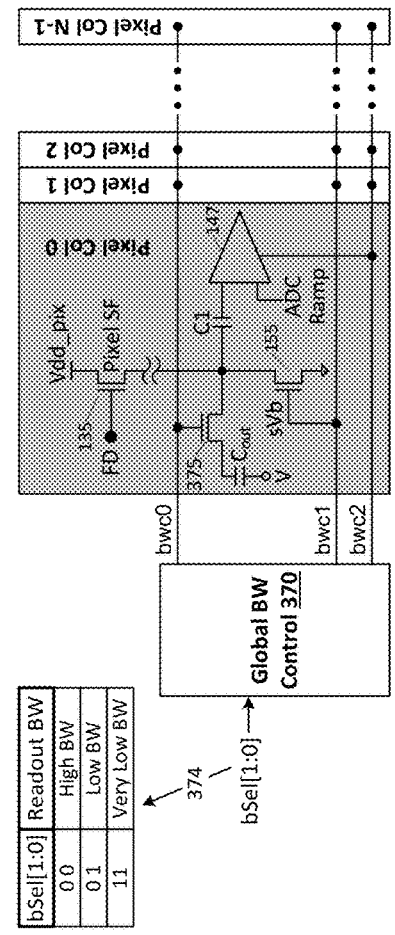
FIG. 8
FIG. 9

IMAGE SENSOR WITH OVERSAMPLED COLUMN OUTPUT

CROSS-REFERENCE TO RELATED APPLICATIONS

This application hereby claims priority to and incorporates by reference each of the following U.S. Provisional patent applications:

| application Ser. No. | Filing Date | Title |
| --- | --- | --- |
| 62/112,738 | 6 Feb. 2015 | Image Sensor with Oversampled-Small-Signal Dual Path Readout |
| 62/171,714 | 5 Jun. 2015 | Image Sensor With Oversampled Column Output |

TECHNICAL FIELD

The present disclosure relates to the field of integrated-circuit image sensors.

BACKGROUND

Low-light performance continues to be a challenge for CMOS image sensors. In particular, as pixel geometries continue to shrink, second-order sampling inaccuracies have caused readout noise to climb. And, while the SNR (signal-to-noise ratio) loss is somewhat countered in medium-to-bright light conditions by increased resolution, in office lighting conditions, the reduced electron capture of small pixels pushes signal levels so low that readout noise is dominating performance at a wider range of the illumination spectrum.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a dual-conversion image sensor that executes both small-signal and large-signal digitization operations for each pixel readout, selectively outputting either a small-signal or large-signal readout result (or both) per pixel column;

FIG. 2 is a timing diagram illustrating exemplary feedthrough nulling, auto-zeroing and level-dependent digitization operations implemented within the image sensor of FIG. 1;

FIG. 7 illustrates an alternative pixel-output oversampling approach in which an a "test" ADC operation is executed to determine whether the subject pixel-output signal falls within a small-signal ADC range;

FIG. 8 illustrates an embodiment of an accumulation logic circuit that enables the signal-level test and subsequent pixel-output oversampling operations shown in FIG. 7;

FIG. 9 illustrates an embodiment of a bandwidth control circuit capable of implementing the dynamic bandwidth control described in reference to FIG. 7;

DETAILED DESCRIPTION

Figure 3:
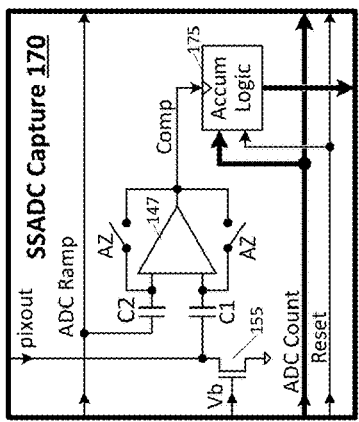
FIG. 3 illustrates an exemplary timing diagram showing readout of small-signals and large-signals including a small-signal oversampling profile that exploits the settling-time and sampling-time differences between small (low-light) and large (brighter-light) signals shown in FIG. 2.

Low-noise image sensors that oversample a low-light pixel output signal and/or dynamically select, according to pixel signal level, between two or more different pixel sampling operations are disclosed in various embodiments. In a number of embodiments, for example, a low-light "small" signal output by a given pixel is digitized multiple times in a rapid sequence of analog-to-digital conversion operations (i.e., oversampled), with the individual digital results combined to yield a reduced-noise small-signal readout result. By contrast, larger pixel output signals (e.g., those for which photon shot noise predominates over readout noise) are digitized in a single analog-to-digital (A/D) conversion operation (or at least fewer A/D conversion operations than in the case of small signals) to yield a large-signal readout result. In embodiments that employ one or more single-slope A/D conversion (ADC) circuits to generate small-signal and large-signal readout results, the ADC ramp voltage is sequenced through a substantially larger range of values for large signals than small signals and thus requires correspondingly longer time to reach a maximum digital value. This is exploited in implementations that concurrently execute parallel small-signal and large-signal A/D conversions, as the small-signal ramp may be repeated multiple times (capturing multiple samples and thus oversampling the pixel output signal) in the time required for a single large-signal ramp—in effect, hiding the small-signal oversampling within the large-signal ramp time. In other embodiments, small-signal and large-signal ADC ramps are generated sequentially (thus reducing ADC hardware) with the large-signal ADC ramp optionally being time-compressed through implementation of nonlinear ramp steps (e.g., according to a visually lossless lookup table or other time-wise ramp compression technique). In yet other embodiments, signal-level testing is carried out at the beginning of a readout interval so that small-signal and large-signal readout may be executed selectively with respect to each pixel column (with small-signal and large-signal readout being executed concurrently or sequentially in the different pixel columns). Various filtering approaches may be applied with respect to oversampled small-signals, and selective readout bandwidth control may be applied to hasten signal settling and provide a low noise environment for ADC operation. In yet other embodiments, multiple analog samples of a low-light pixel output signal are captured and/or pixel readout circuitry dynamically selects between two or more different analog pixel samples corresponding to low-light and brighter light signal ranges. These and other embodiments, features and configurations are described in greater detail below.

FIG. 1 illustrates an embodiment of a "dual-conversion" image sensor 100 that executes both "small-signal" and "large-signal" digitization operations for each pixel readout, selectively outputting either a small-signal or large-signal readout result (or both) per pixel column and thus, generally, an aggregation of small-signal and/or large-signal readout results for a selected row of pixels depending on the scene and image content perceived by individual pixels within the selected row.

In the particular embodiment shown, image sensor 100 includes a pixel array 101, row decoder/driver 103, readout circuitry 105 and readout controller 107. Pixel array 101 is implemented by a multitude of individual pixels 120 spatially distributed in rows and columns, with each row of pixels coupled to a respective set of row control lines, and each column of pixels coupled to a respective column output line, referred to herein as a pixel output line or "pixout." In general, signals conveyed on the row lines and pixout lines are referred to herein by the names of the signal lines themselves, so that, for example, "pixout" may refer to either or both of the pixout line and a pixel output signal conveyed thereon.

Still referring to FIG. 1, row decoder/driver 103 drives row-control signals into the pixel array via the row control lines to sequentially enable pixel-reset and pixel-readout operations within row after row of pixels, sequencing through all the rows of the pixel array to complete a complete array reset or read-out operation. Although not specifically shown in FIG. 1 or other drawing figures, in all cases, one or more column control signals may also be provided to supplement the row-control signals, for example to enable signal-level-dependent readout operations ("conditional read") within individual pixels.

When enabled by the row-control signals, the pixels within a selected row of the pixel array concurrently output analog signals onto their corresponding pixout lines, with those "pixout signals" indicating, at different times, either reset states of the respective pixels or photocharge integration levels within those pixels. The analog pixout signals are digitized within readout circuitry 105 (or more specifically by ADC circuitry 109 therein), with the resulting digital samples and optional qualifying information supplied to digital output logic/buffer 117 to finalize the digitized readout values in preparation for transmission to downstream logic (e.g., image reconstruction logic, fixed or temporal noise correction blocks, or other digital signal processing blocks implemented on the image sensor die and/or separate chip within the same or different integrated-circuit package, for subsequent final image output). A readout controller 107 provides a central point of control within image sensor 100, issuing timing and control signals to the row decoder/driver and readout circuitry in accordance with various hardwired or programmed configurations.

As shown in the exemplary detail view 125, each pixel 120 includes a pinned photodiode 127 as a photocharge integration element (light collection element—any other practicable photosensitive element may be used), aforementioned floating diffusion node 129, transfer gate 131, source-follower transistor 135, reset gate 137 and read-select transistor 139. Transfer gate 131 is controlled (i.e., switched between conducting and non-conducting states) by a transfer-gate signal (TG—a row-control signal, conveyed on a like-named row-control line) and switchably enables photocharge integrated within photodiode 127 to be transferred to floating diffusion node 129. Reset transistor 137 is coupled between the floating diffusion node and a voltage supply rail ("Vdd_pix") and thus, when switched on by assertion of reset-gate signal (RG—another row-control signal, conveyed on a like-named row-control line), switchably couples the floating diffusion node to the supply rail, thus "resetting" the floating diffusion node to a known reference voltage. When TG and RG are concurrently asserted (i.e., their assertions at least partly overlap in time), both floating diffusion node 129 and photodiode 127 are reset to respective reset potentials—an operation generally carried out in one form or another prior to an image-producing exposure (photodiode reset may also be effected by pulsing TG after pulsing RG so that the reset state of floating diffusion node 129 draws photocharge off photodiode 127).

Still referring to the detail view of pixel embodiment 120, source-follower transistor 135 and read-select transistor 139 are coupled in series between the pixout line and supply rail, with the gate terminal of the source-follower transistor coupled to the floating diffusion node, and the gate terminal of the read-select transistor coupled to receive a row-select signal (RS—another row-control signal, conveyed on a like-named row-control line). Though not specifically shown, a constant current (or bias current) is generated on the pixout line during pixel readout so that, when RS is asserted to switchably couple source-follower transistor 135 in the path between the supply rail and pixout, the constant current flows through the source-follower transistor and thus produces a steady-state voltage between the gate and source terminals of that transistor (i.e., fixed $V_{GS}$ according to the bias current). Accordingly, as the floating diffusion potential ($V_{FD}$) rises and falls, the potential at the source of source-follower transistor 135 correspondingly rises and falls to maintain the gate-to-source voltage established by the bias current, and thus the pixout signal level at the source of transistor 135 follows (or tracks) the floating diffusion potential at the gate of transistor—a source-follower operation.

In general, a pixout signal representative of photocharge integrated within a pixel's photodiode during an exposure interval may be generated by (i) asserting reset-gate signal (RG) to reset floating diffusion node 129 to a known "reset" state (e.g., VDD_pix less the threshold voltage of reset transistor 137), (ii) asserting transfer-gate signal (TG) to enable integrated photocharge to be transferred from photodiode 127 to floating diffusion node 129, and (iii) asserting read-select signal (RS) to produce a pixout signal representative of the post-photocharge-transfer potential (which includes the reset potential and transition therefrom due to photocharge transfer) at floating diffusion node 129. To reduce noise in the readout operation (due to its electrical isolation, floating diffusion node 129 is susceptible to various sources of noise, with the noise level being reflected in the pixout signal during pixel readout), a double-sampling of the floating diffusion node—sampling once after reset and then again after photocharge transfer—is implemented to effect a pseudo differential readout and thus a measure of noise cancellation. In this operation, referred to herein as correlated double sampling (CDS), the read-select signal is asserted throughout the operational sequence outlined above to yield, at different times, a pixout signal representative of the floating diffusion (FD) reset-state and then a pixout signal representative of the FD signal-state (i.e., state after photocharge transfer from photodiode to floating diffusion), with the former being subtracted from the latter within downstream readout circuitry to yield a finalized CDS sample.

CDS impact on readout SNR (signal-to-noise ratio) is highly dependent on elapsed time between the reset-state and signal-state samples, an interval referred to herein as the CDS time. More generally, the CDS transfer function may be viewed as a band-pass function that rejects noise at frequencies outside the bandpass, but passes in-band noise into the readout signal. The CDS time determines the lower/bottom frequency of the bandpass, while the upper frequency is determined by the bandwidth of the source follower operation and other circuits in the CDS readout path. Reflecting on this observation and noting that pixout settling time is substantially longer for brighter-light (higher amplitude) signals than lower-light signals, it follows that delaying the signal-state sampling point (increasing the CDS time) to account for worst-case bright-light signal settling time reduces CDS efficacy (i.e., widening the bandpass and thus reducing noise rejection), with the SNR drop being particularly pronounced in small low-light signals. In a number of embodiments herein, this insight is exploited by implementing multiple signal-state sampling operations during each pixel readout, including a relatively short-CDS-time low-light sampling operation, and a longer CDS-time brighter-light sampling operation. Additional noise-reduction features of embodiments discussed below include, for example and without limitation:

- direct-conversion readout architectures in which the pixout signal drives the ADC circuit input during digitization (i.e., lacking the indirection of analog sample-and-hold banks in the path between pixout and the ADC circuitry and thus avoiding noise introduced by those elements);
- active feedthrough nulling to mitigate capacitive feedthrough of row and/or column control signals during readout operations (e.g., asserting one or more nulling signals to counteract control signal feedthrough) and thereby reduce pixout settling time to enable exceedingly brief (and therefore low-noise) small-signal CDS times; and
- selective readout bandwidth control to manage the different settling time requirements for small and large readout signal levels.

While optional (i.e., analog sample-and-hold banks may be provided in the pixout path, feedthrough nulling circuitry may be omitted, and/or fixed read-out bandwidths may be implemented), the foregoing features are implemented within the embodiment of FIG. 1 and carried forward in the examples below in which low-light and brighter-light signals are digitized separately in abbreviated and extended A/D conversions respectively to raise low-light SNR. As an example, a direct conversion architecture is implemented within readout circuitry 105 of FIG. 1, with ADC circuitry 109 being coupled directly to the pixel output lines (no analog sample-and-hold banks). In the implementation shown, ADC circuitry 109 is implemented by a low-noise, single-slope ADC circuit ("SSADC") having an SSADC controller 111 coupled to multiple per-column SSADC capture blocks 115, there being one such capture block for each pixel column. SSADC controller 111 includes a counter 112 to increment through a sequence of ADC count values (also referred to herein as digital numbers or DNs) and a ramp generator 114 to generate an analog voltage ramp ("ADC ramp"), stepping or ramping from one analog voltage to the next as the counter steps from one ADC count to the next.

Referring to the exemplary direct-conversion implementation shown in detail view 145, each SSADC capture block 115 includes a comparator 147, result logic 153, capacitive elements (C1 and C2) and source-follower biasing circuit 155 (shown, conceptually as a single transistor), and is coupled to receive the pixout signal for a respective pixel column and to receive the ADC ramp, ADC count and an auto-zero signal (AZ) from SSADC controller 111, as well as one or more bias voltages, Vb (from the SSADC controller or other source). Comparator 147 compares the incoming pixout signal (i.e., as driven by source-follower transistor of a selected pixel) and stepwise-incremented ADC ramp voltage, asserting a trip signal ("Comp") in response to an ADC ramp step that exceeds the pixout signal level (i.e., ADC ramp step and pixout signal level that cross or change relative potential value with respect to each other from the initial start of measurement state). The comparator-trip signal is delivered to result logic 153 which, as discussed below, includes circuitry to combine multiple samples of a pixout signal determined to fall within a "small-signal" ADC range, and to capture at least a single sample of a pixout signal that exceeds the small-signal ADC range (and thus extends into the "large-signal" ADC range). In the embodiment shown, result logic 153 outputs the A/D converted pixout sample(s) to the digital output logic buffer, which may perform additional operations with respect to pixel readout data before outputting data to downstream logic, including runtime selection between small-signal and large-signal A/D conversion results for a given pixel readout. As explained below, the result logic itself may implement a number of processing or heuristic operations with respect to captured ADC count values (i.e., A/D conversion results), including data summing, averaging, filtering, etc.

To implement correlated double sampling (CDS) within the direct-conversion readout architecture of FIG. 1, the floating diffusion reset-state (i.e., pixel floating diffusion potential immediately after reset) is accounted for in a preliminary "auto-zeroing" of comparator 147 that enables a subsequent clamping of the floating diffusion signal-state (i.e., floating diffusion potential after photocharge transfer from photodiode to floating diffusion node) that accounts for the floating diffusion reset-state. To auto-zero the comparator, the AZ signal is pulsed to close switching element 151a and 151b and thereby temporarily couple the comparator's signal input nodes (i.e., node 148, coupled capacitively to pixout line via capacitive element, C1 and the ADC reference node that is capacitively coupled to the ADC ramp via capacitive element C2 respectively) to the comparator output node to clamp to the comparator offset a fixed "zero" or initial state voltage (in this example, conceptually the comparator offset voltage) while pixout is driven by the reset-state floating diffusion potential. This action preloads the potential across C1 according to the difference between the zero voltage and pixout reset-state signal so that a nominally identical reset-state component of the ensuing signal-state pixout signal will be canceled—a pseudo differential operation analogous to tare of a mass-measurement scale.

The timing diagram in FIG. 2 illustrates exemplary feedthrough nulling, auto-zeroing and level-dependent digitization operations implemented within the image sensor of FIG. 1. As shown, during the reset phase of pixel exposure/readout cycle ("Reset"), TG is raised to enable photocharge transfer from the photodiode to the floating diffusion node, and then RG is raised to drain the transferred charge from the floating diffusion node and photodiode thus effecting a pixel reset. To conclude the pixel reset operation, TG is lowered to decouple the photodiode from the floating diffusion node, and then RG is lowered to decouple the floating diffusion node from the voltage rail, thus isolating the photodiode and floating diffusion (now at the pinned diode potential and floating diffusion reset potential respectively) in preparation for the ensuing exposure interval.

As FIG. 2 shows, the read-select signal (RS) may optionally be asserted during pixel reset so that the floating diffusion potential is reflected in the pixout signal—that is, pixout rises to the reset level (high) when RG is raised. The pixout waveform also illustrates capacitive feedthrough from the TG line to the floating diffusion node, showing an incremental increase and decrease of the floating diffusion potential (and thus the pixout signal level) in response to rising and falling edges of the TG pulse, respectively.

The read-select signal is lowered at conclusion of the reset operation so that the pixout line may be driven by other pixels during the ensuing pixel exposure interval. Thus, though pixout is shown as a steady-state signal during the pixel exposure interval or "integrate" phase of the pixel exposure/readout cycle, in actuality pixout will be driven by other pixels in the subject pixel column, one after another, as those pixels are reset and readout. Also, while not specifically shown in FIG. 2, photocharge integrated within the pixel's photodiode during the exposure interval (which is not shown to scale) will, when transferred to the floating diffusion node in a subsequent readout operation, lower the floating diffusion voltage in proportion to the number of photon strikes, and thus provide a measure of luminance as perceived by the subject pixel.

After the integration (or exposure) interval transpires, the CDS readout phase of the pixel exposure/readout cycle commences with the auto-zeroing operation discussed above. More specifically, at the start of the CDS readout, read-select is raised to enable the floating diffusion potential of the selected pixel to drive the pixout line and the reset-gate signal is pulsed to reset the floating diffusion node. The auto-zero signal is raised shortly thereafter to switchably zero the comparator input isolated by capacitive elements C1 and C2 (i.e., as discussed in reference to FIG. 1). In the embodiment shown, the transfer-gate signal and one or more nulling signals (collectively "Null"—which may be driven onto one or more control signal lines for neighboring or nearby pixel rows, particularly in embodiments in which the floating diffusion node is shared among multiple adjacent pixels within the same pixel column) are raised to a midpoint level in preparation for eventual feedthrough-compensated TG signal assertion, transitions which along with the rising RS edge yield a capacitive feedthrough to the floating diffusion node. The pixel output line moves according to the reset rising edge feedthrough and the AZ signal falls after settling of the reset feedthrough.

At the conclusion of the RG pulse, the floating diffusion potential falls in response to RG trailing-edge feedthrough (canceling the earlier RG rising edge feedthrough) and thus quickly settles at the reset potential, with pixout settling shortly thereafter. Because the auto-zero signal remains asserted after the RG falling edge, the settled reset-state of the floating diffusion node and initial state of the ADC ramp is captured across capacitive elements C1 and C2 respectively (i.e., within the SSADC capture block for the subject pixel column), so that the reset-state component of the ensuing signal-state pixout signal will be canceled at the comparator input. Accordingly, after the reset-state of the floating diffusion node is captured within element C1, the AZ signal is lowered to conclude the auto-zero operation.

In the A/D conversion (digitization) stage of the CDS readout, TG is pulsed to enable in-pixel photocharge transfer from the photodiode to the floating diffusion node, and the nulling signal(s) are simultaneously pulsed with opposite polarity to mitigate TG signal feedthrough (note that the exact timing and/or amplitude of the nulling signal pulses may be varied, for example, through programmed configuration setting, run-time and/or production-time calibration, etc., to tune the nulling operation according to system requirements, operating mode and so forth). This photocharge transfer operation drives the floating diffusion potential and thus the pixout signal level in accordance with the integrated photocharge, with brighter-light (larger) pixout signals requiring longer settling time than low-light pixout signals as FIG. 2 illustrates. Shortly after TG is raised (or, alternatively, after the TG pulse is concluded), the ADC ramp voltage commences stepping and proceeds monotonically from minimum to maximum voltage levels, producing a ramp waveform shown and described herein as an ascending ramp. In actuality, the ramp polarity may be inverted from its depiction, progressing from a more positive minimum value to a more negative maximum value.

Because the ADC ramp waveform is received and compared to a respective pixout signal within each of multiple SSADC capture blocks (i.e., supplied globally to the SSADC capture blocks), the comparator-trip signal ("Comp") generated within each SSADC capture block may occur at a different ramp step (voltage level) and thus at a different point in time than those of other SSADC capture blocks, according to the pixout signal amplitudes for respective pixel columns. As each such trip-event constitutes a reset-state-compensated A/D conversion for a respective pixel column, and thus a conclusion of the CDS operation for that pixel column, the CDS time (i.e., $t_{CDS}$: interval between falling edge of RG and comparator trip) may vary substantially from column to column, in accordance with column-to-column pixout signal level differences.

FIG. 3 illustrates a small-signal oversampling profile that exploits the settling-time and sampling-time differences between small (low-light) and large (brighter-light) signals shown in FIG. 2. More specifically, instead of executing a single voltage ramp to enable ADC conversion of both small and large signals, a small-signal/large-signal threshold level is determined (e.g., point at which photon shot noise begins to predominate over readout noise) and used to define a small-signal ramp maximum range or duration that is substantially lower than the full-ramp maximum range or duration required to capture the pixout signal range from dark to full-well. In a number of embodiments, for example, a small-signal ramp maximum may be on the order of 10-20 times lower than the large-signal ramp maximum, meaning that a step-wise and time-wise linear small-signal ADC ramp (i.e., uniform voltage steps with uniform time intervals between voltage steps, traversing the voltage range between zero and the small-signal/large-signal threshold) will take only a fraction of the time required for a large-signal ADC ramp having the same per-step duration and voltage change. Moreover, the total small-signal ramp time may be less than the large-signal settling time so that, multiple small-signal ADC conversions, each involving a repetition of the small-signal ramp, may be executed in the time otherwise required for large-signal settling.

In the embodiment of FIG. 3, a time-compressed nonlinear (or piece-wise linear) large-signal ADC ramp is executed immediately after the final small-signal ramp to generate single-sampled A/D conversion result for pixout signals above the small-signal threshold. In one implementation, for example, the large-signal ADC ramp is executed according to a visually-lossless lookup function such that ramp steps grow progressively larger in later stages of the ramp (i.e., on the principle that otherwise equal changes in luminance are less perceptible at brighter light levels), thus enabling completion of the large-signal ADC ramp in substantially fewer ramp steps than a step-wise linear ramp spanning the same range. Additionally (or alternatively), the time between ramp steps may grow progressively smaller as the large-signal ADC ramp proceeds (and the large pixout signal begins to settle), thus further lowering the large-signal ramp time. Further, the large-signal ramp may skip most or all of the small-signal ADC ramp range (as any pixout signals falling below the small-signal/large-signal threshold will yield valid small-signal ADC results). Also, the small-signal and large-signal ADC ramps may have different bit-per-photocharge (or bit-per-electron) resolution—a resolution difference that may be accounted for to ensure adequate fixed pattern noise correction for the small signal values. More generally, while VLL compression has a number of benefits (effect on results can be reliably predicted, compression factor may be fixed and inversion process is relatively simple), virtually any large-signal ADC ramp profile and/or resolution that meets timing budget constraints may be employed, including a time-wise and/or step-wise linear ADC ramp.

Execution of the oversampled small-signal ADC operations and time-compressed large-signal ADC shown in FIG. 3 will yield one of multiple possible ADC results for each pixel column, depending on the pixout signal level for that column. More specifically, if the pixout signal falls below the small-signal/large-signal threshold, then a respective ADC result will be generated during each of the small-signal A/D conversions (e.g., yielding eight ADC values in the 8× oversampling implementation shown), and an ADC result will also be generated during the large-signal A/D conversion. By contrast, if the pixout signal exceeds the small-signal/large-signal threshold, then no comparator trip will occur during the small-signal oversampling (i.e., no valid small-signal ADC result) and only a large-signal ADC result will be generated. Further, if the pixout signal falls within a marginal range of the small-signal/large-signal threshold, then fewer than all of the small-signal ADC operations may yield valid ADC results, with those results being accompanied by a valid large-signal ADC result.

In a number of embodiments, the result logic shown in FIG. 1 includes circuitry to account for the different per-column readout contingencies, including logic to combine oversampled small-signal ADC results, for example, implementing an averaging filter, FIR (finite-impulse-response) filter, median-set filter (i.e., discarding maximum/minimum values), etc. In different result logic implementations (or programmed operating modes or configurations), the number of valid small-signal samples may be taken into account, requiring that full set of small-signal ADC results be valid before determining a combined small-signal ADC result, or tolerating a smaller set (e.g., in the case where pixout digitization yields statistical outliers). In yet other embodiments, the small-signal ramp range may extend marginally beyond the count value corresponding to the small-signal/large-signal threshold to ensure that any signal falling below the small-signal/large-signal threshold will yield a comparator-trip event, despite a predetermined noise being larger than a theoretically predetermined signal level where read noise is dominated by the photon shot noise. For example, if the small-signal/large-signal threshold corresponds to a small-signal ADC Ramp count of 240, the small-signal ramp count may be extended to 255 to ensure that any small signal, within a desired level of deviation (15 ramp steps in this example), will yield a small-signal comparator trip event.

Figure 4:
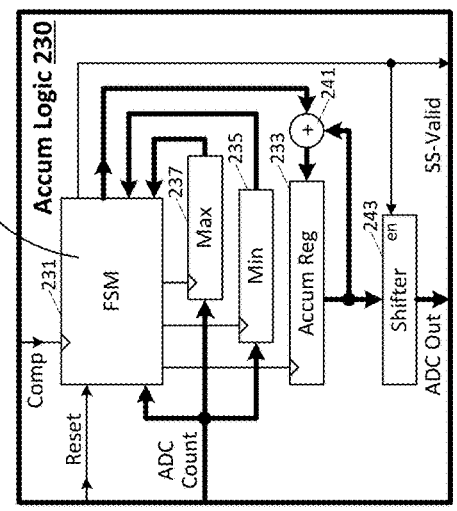
FIG. 4 illustrates a more detailed embodiment of an single-slope analog-to-digital conversion (ADC) capture block that may be implemented within the ADC circuitry of FIG. 1.

FIG. 4 illustrates a more detailed embodiment of an SSADC capture block 170 that may be implemented within the ADC circuitry of FIG. 1 and that includes, as an implementation of result logic element, an accumulator logic circuit 175. As shown, in addition to receiving the comparator-trip signal, Comp (generated by comparator 147 which is capacitively coupled to a current-biased pixout line and conductively or capacitively coupled to the ADC ramp line as generally described above), and ADC count values, accumulator logic 175 receives a reset signal ("Reset") that serves to reset an accumulation register and/or finite state machine therein prior to small-signal oversampling. While the comparator-trip signal is shown as strobing the accumulation operation within the SSADC capture embodiment of FIG. 4 (i.e., strobing accumulator logic 175) and other embodiments discussed below, in all cases the comparator-trip signal may be used to latch the ADC count value into an ADC capture register (thus latching the count of the A/D conversion) with a separate "accumulate strobe" signal being asserted at the conclusion of each small-signal ramp to strobe the latched ADC count value into the accumulator logic (i.e., where it is combined with previously latched ADC count values, if any). In this latter approach, the accumulator logic circuits (e.g., 175) within all SSADC capture blocks are operated in lock step.

Figure 5:
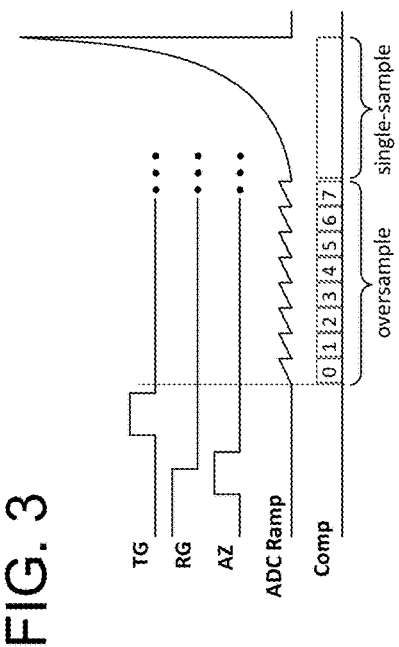
FIG. 5 illustrates an embodiment of an accumulator logic circuit that may be used to implement the accumulator logic of FIG. 4.

FIG. 5 illustrates an embodiment of an accumulator logic circuit 200 that may be used to implement the accumulator logic 175 of FIG. 4. As shown, accumulator logic 200 includes an accumulation register 201 and sample counter 203 (each having strobe inputs coupled to receive the comparator-trip signal, "Comp"), as well as a summation circuit 205, logic gate 209 and shift logic 207. A reset signal is supplied to accumulation register 201 and sample counter 203, clearing the contents of the register and counter when asserted, and thus preparing accumulation logic 200 for a subsequent pixel readout. Summation circuit 205 is coupled to receive the incoming ADC count as well as the output of accumulation register 201, with the summation circuit output, the sum of the two inputs, being fed back to a load-port of accumulation register 201. By this arrangement, the first comparator trip event (i.e., first Comp signal assertion following reset) will load the incoming ADC count into accumulation register (thus completing an A/D conversion operation) and increment sample counter 203, and each subsequent comparator-trip event will result in sample accumulation within the accumulation register and counter increment so that the total number of accumulated A/D conversion results (i.e., digital samples) will be reflected by the sample counter output or "sample count."

Still referring to FIG. 5, the sample count is supplied to logic gate 209 which raises a small-signal validation bit (SS-Valid) when the sample count output indicates a threshold small-signal sample population (i.e., the minimum number of small-signal samples required to validate the small-signal output which could be, for example, eight (8) in the exemplary small-signal oversampling arrangement shown in FIG. 3). The small-signal validation bit is supplied to shift logic 207, enabling a bitwise shifting of the accumulation register output when asserted (thus dividing the accumulation register output by 2, 4, 8, etc., in accordance with the desired small-signal oversampling factor), and enabling the accumulation register output to pass through un-shifted when deasserted. By this arrangement, shift logic 207 outputs, as the ADC output value, either an average of the accumulated small-signal samples together with asserted small-signal validation bit, or the sole large-signal sample (unshifted) with a deasserted small-signal valid bit, with the ADC output value having the same bit depth in either case. Downstream logic may use the small-signal validation bit to manage image reconstruction, make exposure decisions (e.g., as part of auto-exposure control), implement heuristic functions or for any other purpose. Also, in alternative embodiments, the sample count value itself may be output instead of (or in addition to) the small-signal validation bit (e.g., for image reconstruction, diagnostic or other purposes).

In an alternative embodiment, FIG. 5 may be modified to accommodate a small-signal sample count greater than one, but less than the expected number (e.g., eight in the exemplary diagram of FIG. 3). For example, a latch may be provided to store the most recently captured A/D conversion result, with the SS-Valid signal being applied to select (e.g., multiplex) between the output of shift logic 207 and the last-captured A/D conversion result.

Figure 6:
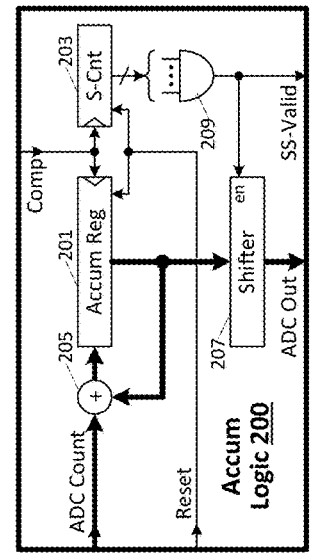
FIG. 6 illustrates an alternative accumulation logic embodiment having a finite state machine that enables selective accumulation of small-signal ADC results, for example, by excluding (as outliers) minimum and maximum ADC values.

FIG. 6 illustrates an alternative accumulation logic embodiment 230 having a finite state machine 231 that enables selective accumulation of small-signal ADC results, for example, by excluding (as outliers) minimum and maximum ADC values. In the embodiment shown, accumulation logic 230 includes, together with the aforementioned finite state machine (or sequencer, other control logic implementation), a maximum-value register 237, minimum-value register 235, accumulation register 233, summation circuit 241 and shift logic 243. Finite state machine 231 ("FSM") receives the ADC count, comparator-trip signal, reset signal and contents of the minimum-value and maximum-value registers, and, based on those inputs and its current state, outputs respective load-enable signals to accumulation register 233, maximum-value register 237 and minimum-value register 235 (those signals being supplied to register strobe inputs, to strobe data into the subject registers, for example), as well as a reset signal (not shown) to accumulation register 233. By this operation, the finite state machine 231 selectively enables the incoming ADC count value to be loaded into the maximum-value and/or minimum-value registers, and enables either the incoming ADC count, or a value from the minimum-value register or maximum-value register, to be accumulated within the accumulation register. Finite state machine 231 also generates a small-signal validation bit (e.g., when a predetermined number of ADC results have been received following a reset signal assertion) to selectively enable or disable a bit-wise shift (i.e., binary division) operation within shift logic 243—generally as described in reference to FIG. 5.

Detail view 250 illustrates an exemplary set of decisions and register load actions implemented by finite-state machine 231 to exclude minimum and maximum small-signal ADC results from an accumulated small-signal sample set and thus yield a filtered subset of the total number of ADC results. Starting at 251, if the reset signal is asserted (i.e., "Reset==1"), then a sample count maintained within finite state machine 231 (represented by 'i' in view 250) and the contents of accumulation register 233 (represented by "Sum" in view 250) are cleared and remain cleared until the reset signal is deasserted. After reset signal deassertion, the finite state machine remains in the reset state until the comparator-trip signal is asserted—an operation illustrated by decision block 255. Upon detecting a comparator-trip signal event (affirmative decision at 255), the sample count is evaluated to determine if the comparator-trip event is the first or second in the small-signal oversampling sequence. If the comparator-trip event is the first in the oversampling sequence (affirmative decision at 257), then the incoming ADC count (i.e., A/D conversion result in view of the comparator-trip event) is loaded into each of the maximum-value and minimum-value registers (i.e., "Max=Min=Si," where 'Si' is the A/D conversion result corresponding to sample count 'i') and the sample-count is incremented at 285. By contrast, if comparator-trip event is the second in the oversampling sequence (negative determination at 257, affirmative determination at 261), then the incoming ADC count is compared with the contents of the maximum-value register at 265 (i.e., as the maximum-value register will at this point contain the immediately preceding A/D conversion result). If the newly received ADC count is greater than the ADC count stored in the maximum-value register (affirmative determination at 265), then the new ADC count is stored within the maximum-value register as the new maximum. Otherwise, if the new ADC count does not exceed the previously stored maximum (negative determination at 265), the new ADC count is stored within the minimum-value register as the new minimum. In either case, new maximum stored at 267 or new minimum stored at 269, the sample count is incremented at 285.

Up to this point, no A/D conversion results have been accumulated within the accumulation register, though two comparator-trip events have occurred. For each subsequent comparator-trip event, the incoming ADC count is compared with the maximum at 271. If the ADC count is greater than the stored maximum, the stored maximum is added to the accumulated sample set (i.e., finite state machine selects content of maximum-value register to be summed with current contents of accumulation register) at 273, an accumulation operation indicated by operator '+=' (i.e., "Sum+=Max" being equivalent to "Sum=Sum+Max"). After the prior maximum value has been accumulated within the accumulation register (or concurrently with that operation), the incoming ADC count is stored as the new maximum as shown at 275 (i.e., FSM asserts load-enable signal to the maximum-value register). If the incoming ADC count is not greater than the stored maximum (negative determination at 271), then the ADC count is compared with the stored minimum at 277. If the ADC count is less than the stored minimum, then the stored minimum is added to the accumulated ADC result set at 279, and the incoming ADC count is stored as the new minimum at 281. If the incoming ADC count is neither above the stored maximum nor below the stored minimum (negative determinations at 271 and 277), the ADC count is added to the accumulated ADC result set at 283. In each case (new maximum, new minimum, or between maximum and minimum), the sample count is incremented at 285 in preparation for the next comparator-trip event. By this operation, when a predetermined number of small-signal ADC results have been received, the accumulated total will exclude the maximum and minimum ADC results (with those values remaining in the maximum-value and minimum-value registers until being overwritten during a subsequent small-signal oversampled readout). Also, though not specifically shown in detail view 250, upon reaching the predetermined sample count, finite state machine 231 may raise the small-signal validation bit ("SS-Valid") to enable operation of shift logic 243 and signal downstream logic regarding the small-signal ADC capture. Further, with respect to large-signal capture, finite state machine 231 may receive an additional signal that enables small-signal and large-signal ADC operations to be distinguished, and thus enable a sole large-signal ADC result to be loaded into accumulation register 233 and, from there, output from accumulation logic 230 without shifting as the ADC output value. Alternatively, finite state machine may receive a clock or other timing signal that enables small-signal and large-signal ADC results to be distinguished (e.g., by virtue of when the comparator-trip signal is asserted in relation to reset signal assertion, by measuring an elapsed time without a repeated comparator-trip event, etc.), and then enable a thus-determined large-signal ADC result to be loaded into accumulation register 233 and output therefrom to downstream logic.

Reflecting on the maximum/minimum sample exclusion operation executed within the accumulation logic of FIG. 6, it should be noted that numerous other sample filtering or sample processing operations may be executed. For example, instead of excluding maximum and minimum values, a finite state machine (or other control or processing circuitry) may exclude statistical-outlier samples (including excluding a variable number of samples ranging from zero to some predetermined number) from the final "validated" set of samples. In such embodiments, the statistical deviation used to distinguish valid from outlier samples may be determined based on the sample population itself (optionally with iterative refinement as outliers are evicted), or may be a fixed or programmable offset with respect to a sample median, average or other center value (again with such center value optionally being iteratively refined as outliers are removed). More generally, multiple alternative sample-exclusion policies may be supported within a given imaging embodiment, with the applied sample-exclusion policy and any number of parameters therefor (e.g., specific values to be applied in outlier determination algorithm and/or heuristic) being established by programmed setting(s) within one or more configuration registers. With regard to programmability, it should be noted that the small-signal/large-signal threshold or any other decision thresholds applied within the image sensor or associated logic may be programmable. For example, the small-signal/large-signal threshold may be made programmable to provide a bit range marginally higher than needed, provide overhead with respect to read-noise level, etc.

FIG. 7 illustrates an alternative pixout oversampling approach in which an initial "test" ADC operation, referred to herein as signal-level test, is executed to determine whether the subject pixout signal falls within the small-signal ADC range (i.e., under or sufficiently under the small-signal/large-signal threshold) and to conditionally manage subsequent ADC operations accordingly. In the implementation shown, additional read-out control signals, SL-Test (signal-level test) and AccEn (accumulate-enable), are provided to the SSADC capture blocks to enable the signal-level test operation, and, optionally, prevent accumulation of the test ADC result.

Although not specifically shown in FIG. 7, the test ramp may terminate marginally below the maximum ramp step for small-signal A/D conversion to ensure that a small-signal determination (i.e., comparator-trip event during test ramp) will yield comparator-trip events during ensuing small-signal oversampling (i.e., avoid a "false-positive" conclusion that a given signal falls under the small-signal/large-signal threshold). In other embodiments, the test ramp may proceed beyond the maximum ramp step for small-signal A/D conversion to avoid a false-negative with respect to small-signal identification. For example, the test ramp may extend a predetermined number of extra steps beyond the maximum step for small-signal A/D conversion, with the predetermined number of extra steps selected (or programmed directly or parametrically within a configuration register) to account for anticipated noise.

Still referring to FIG. 7, additional readout control signals may be provided to establish a sequence of different readout bandwidths during progression of the pixel readout operation. For example, after applying a very low bandwidth (with very low noise) during the auto-zero operation (reset-state capture) and oversampled small-signal digitization and large-signal digitization, bandwidth may be modulated during the subsequent signal-level test and the small-signal oversampling operations that follow, progressing from a low bandwidth during signal-level test to one or more very low bandwidths during small-signal oversampling, thereby effecting a more uniform (or at least reducing variation in) CDS bandpass. For example, if the low bandwidth applied during signal-level test yields a CDS bandpass of N, the increased CDS time of the subsequent small-signal samples (which would otherwise yield incrementally larger CDS bandpass values) can be countered by lowering the bandwidth setting to very low, or even multiple very low bandwidth levels. Further, very low bandwidth can be used in the small-signal oversampling operations with assurance that any small-signal will have settled (i.e., by virtue of a small-signal determination during signal-level test). Additionally, the bandwidth control logic may enable a relatively high bandwidth for a brief interval prior to large-signal ADC ramp generation, thus reducing large-signal settling time and, accordingly, large-signal CDS time (i.e., as the large-signal ramp may commence at an earlier point in time and/or increase more rapidly). In yet other embodiments, low read-out bandwidth (instead of very low) may be implemented during auto-zero, signal-level test and small-signal/large-signal digitization, so that the only readout bandwidth transition is the brief switch from low-bandwidth to high-bandwidth and back following the small-signal oversampling interval. Further, different bandwidths may be applied during small-signal oversampling (e.g., very-low) than during single-sample large-signal capture.

FIG. 8 illustrates an embodiment of an accumulation logic circuit 330 that enables the signal-level test and subsequent pixout oversampling operations shown in FIG. 7. As shown, accumulation logic 330 includes an accumulation register 333, summation circuit 335 and shift logic circuit 337 that function as discussed above in reference to FIG. 5, with the addition of an additional control (accumulation-enable) and with inversion of the enable-input to shift logic 337. Accumulation logic 330 additionally includes a signal-level register 339 to sample the comparator-trip signal ("Comp") at the conclusion of a signal-level test ramp and thus generate a high or low signal-level output according to whether the test ramp produced a comparator-trip event. More specifically, following a reset signal assertion (which delineates readout operations in sequentially selected pixels of a given pixel column and serves to clear signal-level register 339 and accumulation register 333), an auto-zero operation is executed to capture the floating diffusion reset-state of the selected pixel, followed by a photocharge transfer operation (TG signal assertion, with or without feedthrough compensation), and then assertion of the SL-Test signal during progression of the ADC test ramp. After the test ramp has reached a predetermined maximum (which may be set marginally below or above than the maximum for small-signal A/D conversion as discussed above), the SL-Test signal is lowered, thus strobing the state of the comparator output signal, high or low and thus tripped or not tripped, into signal-level register 339, from which it is output as the signal-level determination, SigLev. Thus, in the specific embodiment shown, a low comparator output (indicating a non-tripped condition) will, due to the inverting input of register 339, yield a logic high SigLev bit to indicate that the pixout signal exceeds the small-signal threshold (or at least the somewhat lower threshold represented by the test ramp maximum) and is thus a large signal. Conversely, a high (tripped) comparator output will yield a logic low SigLev bit to indicate that the pixout signal falls within the small-signal ADC range (i.e., is a small signal).

Still referring to FIG. 8, the signal-level bit is output in place of the small-signal validation bit discussed above, and is also supplied to an active-low enable input of shift logic 337 to alternately enable shifting (binary division) of an accumulated set of small-signal ADC results (i.e., the output of accumulation register 333) and disable shifting of a single-sample large-signal ADC result (also output from accumulation register 333). In the particular implementation shown, no ADC result is to be accumulated during signal-level test, a behavior enforced by the accumulate-enable signal (AccEn). More specifically, accumulate-enable is supplied to an enable input of the accumulation register and held low during the test ramp (i.e., during the signal-level test interval) to suppress accumulation of the ADC count in the event of a comparator-trip during signal-level test. After signal-level testing is complete, accumulate-enable is raised to enable either the oversampled small-signal ADC results or the single-sampled large-signal ADC result to be captured within accumulation register 333 and output to shift logic 337. Note that in alternative embodiments the high state of the SL-Test signal may be used to disable accumulation (e.g., supplied to an active-low enable input of accumulation register 333), obviating the accumulate-enable signal.

FIG. 9 illustrates an exemplary bandwidth control circuit 370 capable of implementing the dynamic bandwidth control described in reference to FIG. 7—that is, enabling readout bandwidth to be switched between two or more levels, trading SNR for faster settling time and vice-versa. In the particular implementation shown, a two-bit bandwidth selection value, bSel[1:0], is generated within the SSADC controller or readout controller (i.e., element 111 or element 107 of FIG. 1) to establish different readout bandwidths (e.g., very low, low and high as shown in truth table 374) at respective times during a pixel readout sequence. Because the readout bandwidth selected at a given time is applied uniformly in all SSADC capture blocks and thus to each of the pixout lines, bandwidth control circuit 370 is referred to as a "global" control circuit, in contrast to a per-column control circuit that enables different readout bandwidths to be applied simultaneously within respective pixel columns. Bandwidth control circuit 370 responds to the bandwidth selection value, which may include more than two bits in alternative embodiments, by outputting different combinations of digital and/or analog signals to the SSADC capture blocks.

Still referring to FIG. 9, one of the bandwidth selection bits may be supplied to multiplexers or other selector circuits that, in response to selection bit state, pass one of two different bias voltages to the gates of source-follower bias transistors 155 (or current mirrors or other circuits that effect a constant current on pixout to establish the source-follower operation described above) and that also pass selected analog and/or digital control signals to comparator 147. By this arrangement, when a lower bias voltage (Vbl) is selected (and supplied, as selected bias voltage "sVb," to the gates of respective bias transistors 155), a relatively low bias current is effected on the pixout lines of the pixel array and, therefore, a reduced bandwidth readout configuration. Conversely, when a higher bias voltage (Vbh) is selected, the resulting relatively high biasing current effects an increased readout bandwidth. With respect to comparator 147, the selected control signals may be used to adjust capacitance of one or more internal nodes, bias currents, etc.

In one embodiment, the second bandwidth selection bit is applied to switchably couple per-column capacitive elements to respective pixout lines, thus selectively increasing pixout capacitance and thereby further reducing readout bandwidth. One potential advantage of this approach is that adjusting the pixout capacitance (i.e., switchably coupling/decoupling capacitive element $C_{out}$ to/from pixout) does not appreciably change the source follower bias point and thus may avoid introducing a DC offset as the readout bandwidth is switched from, for example, low to very low. In alternative embodiments, multiple readout bandwidth settings may be established by switchably coupling a selected number of capacitive elements to the pixout line, in conjunction with or instead of bias voltage selection. In yet other embodiments, readout bandwidth may also (or alternatively) be varied by switching on a varying number of biasing transistors (e.g., instead or in addition to varying the bias voltage selection, which may include selection between more than two biasing voltages), as well as selective bandwidth adjustment within comparator 147.

Returning briefly to FIG. 7, in instances where the signal-level test yields a small-signal determination, additional logic may be provided to ensure that all small-signal ADC operations contribute to the accumulated total. For example, a sample delineation signal may be asserted at the conclusion of each small-signal ramp so that, if no comparator-trip event was detected, a predetermined value (e.g., maximum small-signal A/D conversion value) is added to the accumulated total to ensure the requisite sample population. Similar logic and operation may be provided with respect to the approaches shown in FIGS. 3-6 as well those described below.

FIGS. 10-14 relate to image sensor embodiments which concurrently implement oversampled small-signal digitization and single-sampled large signal digitization within respective pixel columns, employing the signal-level test operation described above to determine a given pixout signal level, small or large, and then capturing either a small-signal or large-signal ADC result accordingly.

Figure 10:
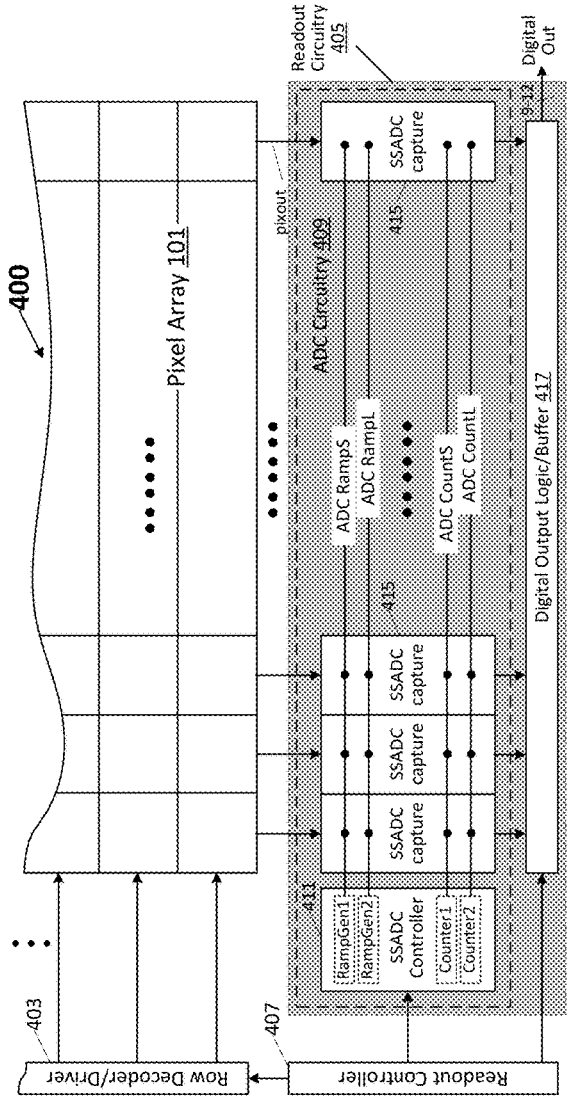
FIG. 10 illustrates an embodiment of an image sensor that selectively and concurrently generates oversampled small-signal and single-sampled large-signal ADC results.

FIG. 10 illustrates an embodiment of an image sensor 400 that selectively and concurrently generates oversampled small-signal and single-sampled large-signal ADC results. As shown, image sensor 400 includes a pixel array 101, row decoder/driver 403 and readout controller 407, each of which is implemented and operates generally as described above, though readout controller 407 may generate additional and/or different timing and control signals to manage concurrent large-signal and small-signal ADC operations.

Image sensor 400 also includes readout circuitry 405, formed by ADC circuitry 409 and digital output logic/buffer 417. In the embodiment shown, ADC circuitry 409 includes an SSADC controller 411 modified to include two ADC counters (Counter1, Counter2) and ramp generators (RampGen1, RampGen2), one for iterative small-signal ADC operation (i.e., small-signal oversampling) and one for single-sample large-signal ADC ramp generation. Both ADC counts and ADC ramps are supplied to each of the per-column SSADC capture blocks 415, with the small-signal ADC count and ADC ramp designated "ADC CountS" and "ADC RampS," respectively, and the large-signal ADC count/ADC ramp designated "ADC CountL"/ADC RampL." As discussed below, each of the SSADC capture blocks selectively captures either an oversampled small-signal ADC result or a single-sample large-signal ADC result, outputting the captured ADC result together with a signal-level bit to digital output logic/buffer circuit 417 for eventual transmission/delivery to downstream reconstruction logic.

Figure 11:
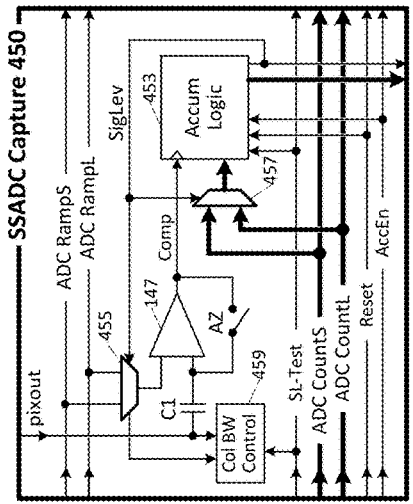
FIG. 11 illustrates an embodiment of a single-slope ADC capture block that may be used to implement each of the ADC capture blocks shown in FIG. 10.

FIG. 11 illustrates an embodiment of an SSADC capture block 450 that may be used to implement each of the SSADC capture blocks 415 shown in FIG. 10. As shown, capture block 450 includes an auto-zeroing comparator 147 as described above (i.e., having a directly-coupled ADC ramp input and C1-coupled pixout input), and also includes accumulator logic 453 that operates generally as described in reference to FIG. 8, carrying out signal-level test and ADC capture operations in response to reset, signal-level-test and accumulate-enable signals. Capture block 450 additionally includes a ramp multiplexer 455 to select between incoming small-signal and large-signal ADC ramps (supplying the selected ramp voltage to the ramp input of comparator 147), and a corresponding count multiplexer 457 to select between incoming small-signal and large-signal ADC count values, supplying the selected count value to accumulator logic 453. Multiplexers 455 and 457 are controlled by the signal-level bit (SigLev) from accumulator logic 453, and thus select as outputs either the small-signal ADC ramp and ADC count or the large-signal ADC ramp and ADC count according to the signal-level test result.

Still referring to FIG. 11, SSADC capture block 450 additionally includes a column bandwidth control circuit 459 to enable per-column (i.e., column differentiated) readout bandwidth control in accordance with the signal level determination. In one implementation, for example, column bandwidth control circuit 459 briefly enables high-bandwidth readout in response to a logic-high SigLev bit (i.e., in response to detection of a large-signal pixel output) to expedite pixout settling for the subject pixel column. By contrast, if the signal-level test operation indicates a small-signal readout (SigLev=0), readout bandwidth is switched to or maintained at a precision level (e.g., low or very low as discussed above).

Figure 12:
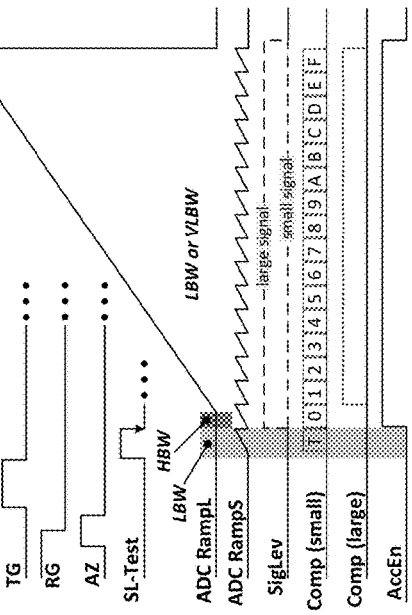
FIG. 12 presents an exemplary timing diagram showing concurrent oversampled small-signal ADC and single-sampled large-signal ADC operation.

FIG. 12 presents an exemplary timing diagram showing concurrent oversampled small-signal ADC and single-sampled large-signal ADC operation. As shown, the signal-level bit is initially low (e.g., following a reset of accumulator logic 453) so that the small-signal ADC ramp and ADC count are applied within all SSADC capture blocks during a signal-level test operation. More specifically, as in the exemplary operational sequence of FIG. 7, control signal, SL-Test, is raised during an initial small-signal ramp (which may terminate at a lower amplitude than during small-signal ADC oversampling), and then lowered at the conclusion of that ramp to latch the state of the comparator-trip output and thus generate a logic high or logic-low SigLev bit according to whether a large or small readout signal, respectively, is present on the pixout line. At the conclusion of the signal-level test interval, concurrent small-signal and large-signal A/D conversions are executed, with the small-signal ramp (and thus small-signal ADC operation) being repeated multiple times within the single large-signal ramp time. In the particular embodiment shown, a time-wise and step-wise linear large-signal ramp is implemented (nonlinear step intervals and/or step amplitudes may be implemented in alternative embodiments or operating modes) over an interval roughly sixteen times as long as the small-signal ramps (e.g., stepping through $2^{12}$ ramp steps, while the small-signal ramp steps through repeating sequences of $2^8$ ramp steps). Accordingly, a 16× small-signal oversampling is achieved in the time allocated to convert large pixout signals. As shown, the accumulate-enable signal remains deasserted during signal-level testing to prevent accumulation of the test ADC result (which may be generated at a low readout bandwidth having, for example, a DC offset relative to the precision bandwidth used during reset-state capture and subsequent small-signal, large-signal A/D conversion), though, as discussed above, the test ADC result may alternatively be included in the small-signal oversample accumulation. Also, separate comparator output waveforms are shown for the oversampled small-signal and single-sampled large-signal ADC operations to contrast the multitude of comparator-trip events during small-signal oversampling (i.e., within a pixel column that yields a small-signal output) with the solitary comparator-trip event during large-signal conversion.

Figure 13:
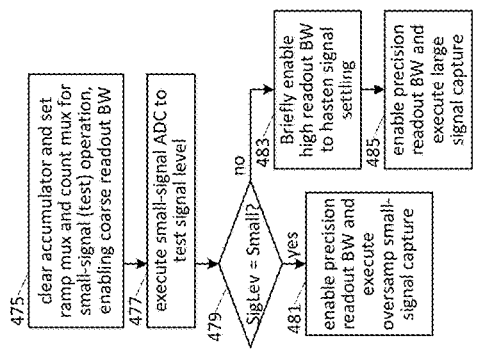
FIG. 13 illustrates an exemplary sequence of operations carried out within the single-slope ADC capture block of FIG. 11 in accordance with the timing and bandwidth profiles shown in FIG. 12.

FIG. 13 illustrates an exemplary sequence of operations carried out within the SSADC capture block of FIG. 11 in accordance with the timing and bandwidth profiles shown in FIG. 12. Starting at 475, the reset signal is asserted to clear the accumulator and configure the per-column ramp multiplexers and count multiplexers for signal-level testing (i.e., small-signal ADC conversion). The signal-level test signal may also be asserted at this point, for example, to enable a low readout bandwidth within each of the pixel columns. Thereafter, at 477, a small-signal A/D conversion is executed within all pixel columns to effect a per-column signal-level test, in each case yielding a signal-level bit (SigLev) that indicates either a small-signal or large-signal pixout level. Depending on the signal-level determination, each SSADC capture block then executes either a sequence of small-signal A/D conversions (affirmative determination at 479), or a single-sample large-signal A/D conversion (negative determination at 479). For small-signal pixel columns, oversampled small-signal capture (i.e., multiple small-signal ADC operations) is executed at 481, optionally after switching from low to very low readout bandwidth. For large-signal pixel columns, readout bandwidth is briefly transitioned from low (or very low) bandwidth to high bandwidth at 483, to hasten large-signal output settling, and then, at 485, to low or very low bandwidth at commencement of the large-signal ADC ramp.

Figure 14:
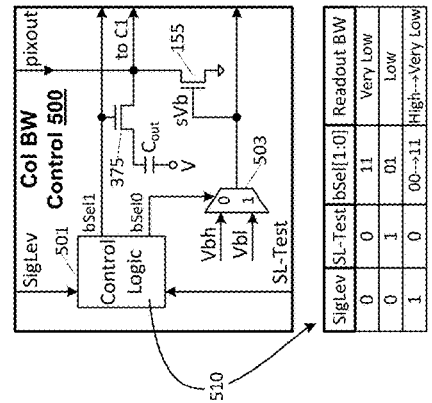
FIG. 14 illustrates an embodiment of a bandwidth control circuit that may be used to implement the column bandwidth control in FIG. 11.

FIG. 14 illustrates an embodiment of a bandwidth control circuit 500 that may be used to implement the column bandwidth control in FIG. 11. As shown, bandwidth control circuit 500 includes control logic 501, bias-voltage multiplexer 503, bias transistor 155, capacitive element, $C_{out}$, and capacitive-interconnect transistor 375. Control logic 501 receives the test signal and signal-level bit (SL-Test and SigLev, respectively) and generates, depending on the states of those two signals, a bandwidth control value, bSel[1:0], that enables either a very-low, low, or high readout bandwidth. More specifically, as shown in truth table 510, when the signal-level bit and test signal are both low (e.g., during auto-zero and small-signal A/D conversion), a very-low readout bandwidth is effected by raising both bSel1 and bSel0, the former switchably coupling $C_{out}$ to the pixout line via transistor 375, and the latter selecting reduced bias voltage, Vbl, within multiplexer 503 and thus establish a relatively low source-follower bias. When test signal SL-Test is raised, a low-bandwidth readout is implemented by lowering bSel1 to switchably decouple $C_{out}$ from pixout, while keeping bSel0 high to maintaining the reduced bias voltage selection at multiplexer 503. These two actions could be reversed in an alternative embodiment in which low bandwidth is implemented by asserting bSel1 and deasserting bSel2. Finally, when the signal-level bit is raised (indicating a large-signal pixout level), both bSel1 and bSel0 are temporarily driven low to effect a high bandwidth readout configuration (i.e., decoupling Cout from pixout and selecting higher bias voltage, Vbh, via multiplexer 503) just prior to large-signal ADC conversion, and then both low to enable very low bandwidth readout. The duration of the high-bandwidth readout may be controlled by a digital or analog timing element (e.g., counter or one-shot element), by an additional control signal, or any combination thereof. Also, though not specifically shown in FIG. 14, bSel0 and/or bSel1 (or one or more additional control bits) may be used to control bandwidth settings within the local ADC comparator as generally discussed above in reference to FIG. 9.

Figure 15:
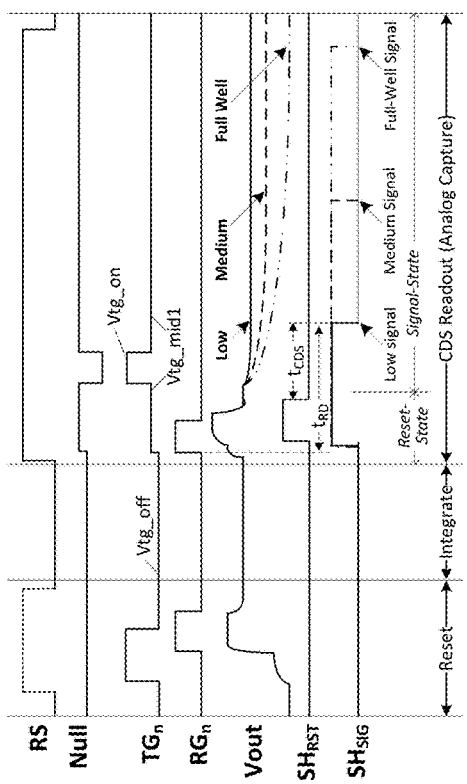
FIG. 15 illustrates an exemplary readout timing diagram similar to that of FIG. 2, except with analog pixel output signal capture instead of direct A/D conversion.

FIG. 15 illustrates an exemplary readout timing diagram similar to that of FIG. 2, except with analog pixout signal capture instead of direct A/D conversion. That is, instead of the auto-zeroing operation and direct-digital ADC ramp shown in FIG. 2, an analog reset-state sample is captured within a sample-and-hold circuit (e.g., capacitive element switchably coupled to pixout line as discussed below) in response to a reset-state sample-and-hold control pulse ($SH_{RST}$) and an analog signal-state is captured thereafter in response to a signal-state sample-and-hold control pulse, $SH_{SIG}$. The reset-state and signal-state may thereafter be digitized within a single-slope, successive-approximation-register or other ADC to yield a digital pixel value corresponding to the analog CDS readout.

As with the digital implementation explained above, the ideal signal-state sampling point varies according to signal level, with different $SH_{SIG}$ pulse widths shown accordingly for exemplary low (or small), medium and full-well signal levels. As the falling edge of the $SH_{SIG}$ pulse switchably decouples the signal-state capacitive element (i.e., within the signal-state sample-and-hold circuitry) from the pixout line, the total CDS time increases as the $SH_{SIG}$ pulsewidth grows. Accordingly, a small pixel output signal may be analog-sampled substantially earlier than a large (or high) pixel output signal, leaving time for analog oversampling that generally parallels the digital oversampling operation described above.

Figure 16:
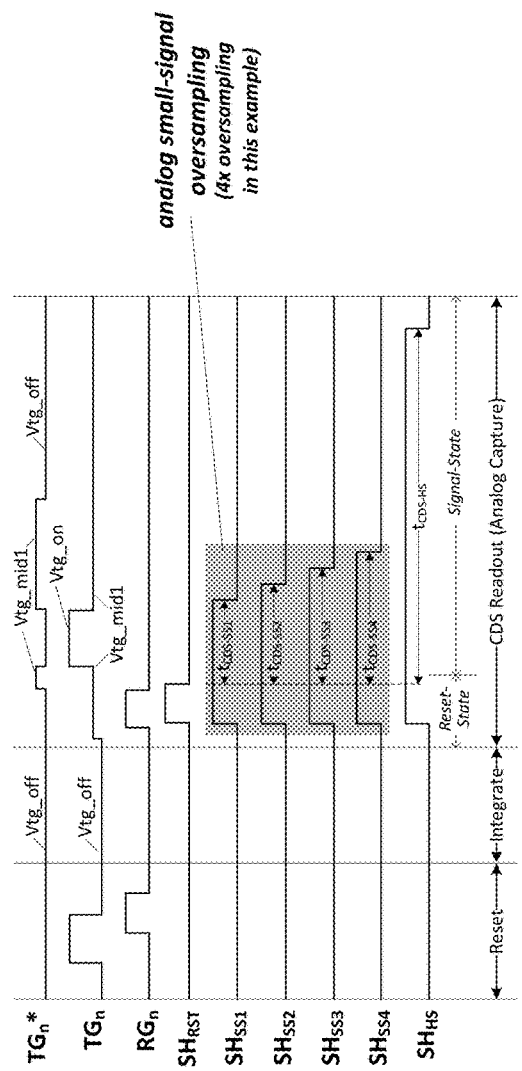
FIG. 16 illustrates an analog oversampling approach in which four (4) small-signal analog samples are captured in respective small-signal sample-and-hold circuits in response to corresponding small-signal-state sample-and-hold control pulses, while a single high-signal analog sample is captured in response to high-signal-state sample-and-hold control pulse.

FIG. 16 illustrates an analog oversampling approach in which four (4) small-signal analog samples are captured in respective small-signal sample-and-hold circuits in response to corresponding small-signal-state sample-and-hold control pulses, $SH_{SS1}$, $SH_{SS2}$, $SH_{SS3}$ and $SH_{SS4}$, while a single high-signal analog sample is captured in response to high-signal-state sample-and-hold control pulse, $SH_{HS}$. Also, though not specifically shown in FIG. 16, the various signal-level test operations (e.g., comparing a small-signal analog sample against an analog threshold to determine whether a subject pixout signal falls within or outside a small-signal range) and/or time-varying bandwidth control techniques (e.g., to equalize the CDS bandpass for the oversampled small-signals and/or hasten settling time in the case of large signals) described above may be applied with respect to the depicted analog sampling operations. Also, while 4× small-signal oversampling is shown, more or fewer analog small-signal samples may be captured per pixout signal. Further, though not specifically shown in FIG. 16, nulling pulses may be generated on TG lines for adjacent rows of pixels (TGn*), other control signal lines and/or dedicated nulling lines to null the RGn rising edge prior to reset-state sample capture.

Figure 17:
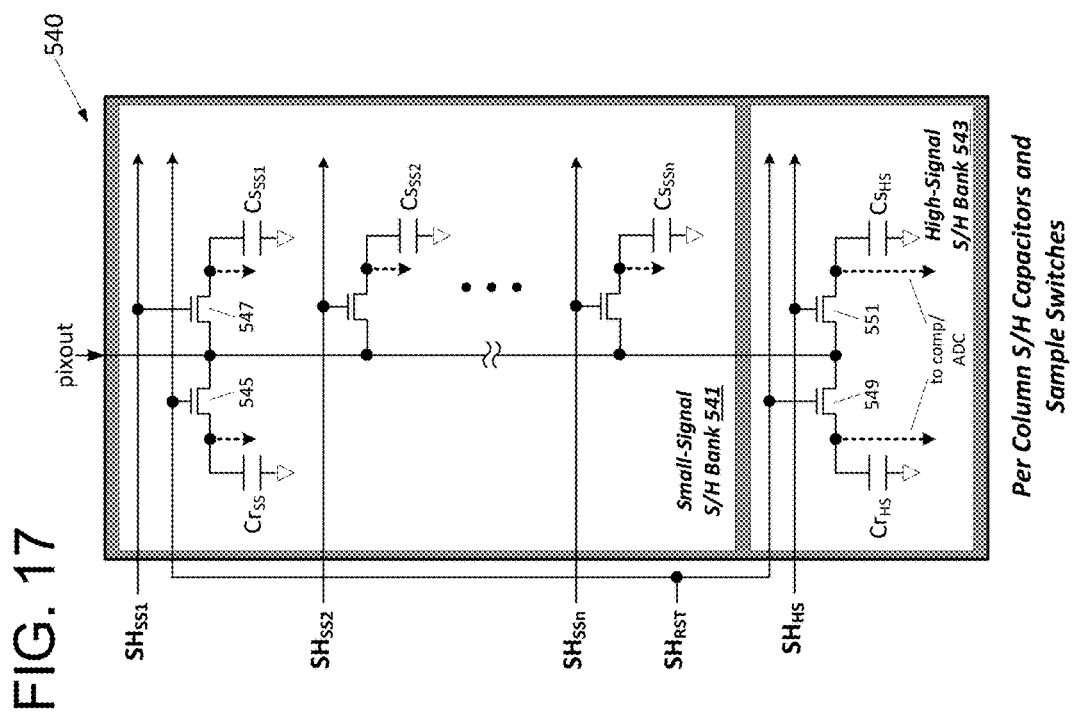
FIG. 17 illustrates an embodiment of a sample-and-hold bank that may be provided for each pixel column within the readout circuitry of an analog small-signal oversampling image sensor.

FIG. 17 illustrates an embodiment of a sample-and-hold bank 540 that may be provided for each pixel column within the readout circuitry of an analog small-signal oversampling image sensor. As shown, separate reset-state capacitive elements $CR_{SS}$ and $CR_{HS}$ are provided within respective small-signal and high-signal sample-and-hold banks 541 and 543 to store analog reset-state samples for the small and high signals, with those capacitive elements being switchably coupled to the pixout line (i.e., via access transistors 545 and 549, respectively) in response to control signal $SH_{RST}$, though a single reset-state capacitive element and access transistor may be used in alternative embodiments (particularly where A/D conversion is commenced simultaneously for the small and high signal ranges).

Still referring to FIG. 17, multiple small-signal capacitive elements ($CS_{SS1}$, $CS_{SS2}$, ..., $CS_{SSn}$) are provided to store respective small-signal analog samples, with each such capacitive element switchably coupled to the pixout line via a respective access transistor 547 in response to a respective small-signal control signal ($SH_{SS1}$, $SH_{SS2}$, ..., $SH_{SSn}$). A single high-signal capacitive element ($CS_{HS}$) is provided and switchably coupled to the pixout line via access transistor 551 in response to a high-signal control signal ($SH_{HS}$), though more than one such high-signal analog sample-and-hold circuit may be provided in alternative embodiments.

Figure 18:
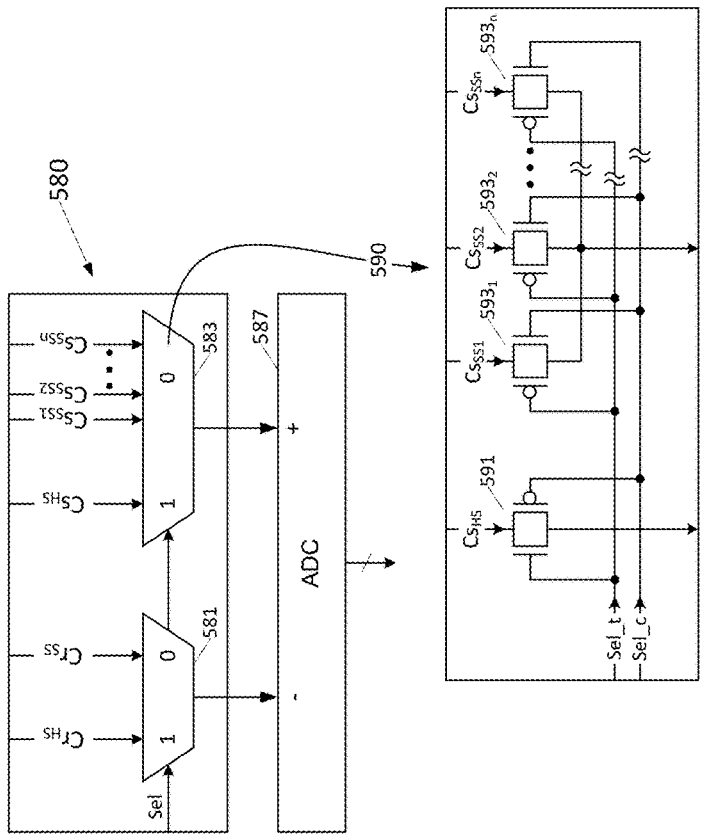
FIG. 18 illustrates an exemplary interconnection of the sample-and-hold circuit outputs (shown by dashed lines in FIG. 17) to an ADC input multiplexer, and from the ADC input multiplexer to an ADC circuit.

FIG. 18 illustrates an exemplary interconnection of the sample-and-hold circuit outputs (shown by dashed lines in FIG. 17) to an ADC input multiplexer 580, and from the input multiplexer to an ADC circuit 587. As shown, input multiplexer 580 includes a reset-state sample multiplexer 581 and signal-state sample multiplexer 583, each of which responds to an incoming select signal ("Sel," which may be generated within a modified version of the readout controller shown in FIG. 1) to select, alternatively and/or at different times, high-signal and small-signal analog CDS results. More specifically, when the select signal is high, reset-state sample multiplexer 581 passes the reset-state sample captured within high-signal capacitive element $CR_{HS}$ (i.e., as shown in FIG. 17) to the '−' input of ADC 587, and signal-state sample multiplexer similarly passes the output of the signal-state sample captured within high-signal capacitive element $Cs_{HS}$ to the '+' input of ADC 587. The '−' and '+' ADC inputs constitute a differential analog input pair, with ADC 587 having circuitry to digitize the difference between the two analog inputs and thus produce a digital representation of the analog CDS result.

Still referring to FIG. 18, when the select signal is low, reset-state sample multiplexer 581 passes the reset-state sample captured within small-signal capacitive element $CR_{SS}$ to the '−' input of ADC 587, and sample-state multiplexer 583 passes an analog signal corresponding to the average of the signal-state samples captured within small-signal capacitive elements $Cs_{SS1}, Cs_{SS2}, \ldots, CS_{SSn}$ to the '+' input of ADC 587. In one embodiment, shown for example in detail view 590, the signal state multiplexer is formed by a set of pass gates 591 and 593$_1$-593$_n$ (i.e., parallel coupled NMOS and PMOS transistors, though a single NMOS or PMOS transistor may alternatively be used), each controlled by complementary instances of the select signal (i.e., Sel_t and Sel_c) such that, when the select signal is low (i.e., Sel_c is high and Sel_t is low), each of pass gates 593$_1$-593$_n$ is switched to a conducting state to couple the outputs of capacitive elements $Cs_{SS1}, Cs_{SS2}, \ldots, CS_{SSn}$ together at the '+' input of ADC 587. By this operation, a charge-leveling occurs between capacitive elements $Cs_{SS1}, Cs_{SS2}, \ldots, CS_{SSn}$ such that an average of their respective voltages is applied at the '+' input of ADC 587. When the select signal is high, pass gate 591 is switched to a conducting state to pass $Cs_{HS}$ to the '+' input of ADC 587, while pass gates 5831-593$n$ are switched to a non-conducting state. Other small-signal averaging circuits may be used in alternative embodiments, and/or separate ADC converter circuits or capture blocks may be provided to digitize small-signal and high-signal analog samples.

The various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit image sensor, the method comprising:
    enabling a first pixel to output, throughout a sampling interval, an analog signal having an amplitude dependent, at least in part, on photocharge integrated within a photosensitive element of the first pixel; and
    generating a plurality of samples of the analog signal during an initial portion of the sampling interval that is shorter than a settling time for a maximum possible level of the analog signal.

2. The method of claim 1 wherein generating the plurality of samples of the analog signal during the initial portion of the sampling interval comprises capturing a plurality of analog samples of the analog signal within respective sample-and-hold elements.

3. The method of claim 1 wherein generating the plurality of samples of the analog signal during the initial portion of the sampling interval comprises generating a plurality of digital samples of the analog signal during the sampling interval in respective limited-range analog-to-digital conversion operations such that a maximum possible value of each of the digital samples corresponds to a level of photocharge integration substantially below a maximum photocharge integration level of the photosensitive element.

4. The method of claim 3 further comprising combining at least two or more of the digital samples to produce a digital pixel value representative of the photocharge integrated within the photosensitive element.

5. The method of claim 4 further comprising excluding at least one of the digital samples from contributing to the digital pixel value based, at least in part, on the value of the at least one of the digital samples relative to values of others of the digital samples.

6. The method of claim 3 wherein the first pixel is disposed within an array of pixels of the integrated-circuit image sensor, and wherein enabling the first pixel to output the analog signal comprises enabling the first pixel to output the analog signal onto a column output line coupled in common to a column of pixels within the array, the column of pixels including the first pixel, and wherein generating the plurality of digital samples of the analog signal comprises generating a plurality of correlated double samples, each of the correlated double samples accounting for an amplitude of an analog signal output from the first pixel prior to the first sampling interval.

7. The method of claim 3 wherein generating the plurality of digital samples in respective limited-range analog-to-digital conversion operations comprises iteratively generating a voltage ramp to be compared with the analog signal.

8. The method of claim 3 wherein the plurality of digital samples constitute an initial set of samples, the method further comprising generating an additional digital sample of the analog signal during the sampling interval in an expanded-range analog-to-digital conversion operation capable of yielding a digital sample value substantially greater than the maximum possible value of the digital samples of the initial set.

9. The method of claim 3 further comprising:
enabling a second pixel to output, throughout the sampling interval, an analog signal having an amplitude dependent, at least in part, on photocharge integrated within a photosensitive element of the second pixel; and
during the sampling interval, generating a digital sample of the analog signal output by the second pixel in an expanded-range analog-to-digital operation capable of yielding a digital sample value greater than the a maximum possible value of the digital samples of the analog signal output by the first pixel.

10. The method of claim 9 wherein generating the plurality of digital samples in the limited-range analog-to-digital conversion operations comprises generating a sequence of limited-range voltage ramps having a first maximum amplitude, and wherein generating the digital sample in the expanded-range analog-to-digital conversion operation comprises generating an expanded-range voltage ramp that exceeds the first maximum amplitude.

11. An integrated-circuit image sensor comprising:
a first pixel having a photosensitive element and circuitry to output, throughout a sampling interval, an analog signal having an amplitude dependent, at least in part, on photocharge integrated within the photosensitive element; and
control circuitry to generate a plurality of samples of the analog signal during an initial portion of the sampling interval that is shorter than a settling time for a maximum possible level of the analog signal.

12. The integrated-circuit image sensor of claim 11 wherein the control circuitry to generate the plurality of samples of the analog signal during the initial portion of the sampling interval comprises analog sample-and-hold circuitry to capture a plurality of analog samples of the analog signal within respective sample-and-hold elements.

13. The integrated-circuit image sensor of claim 11 wherein the control circuitry to generate the plurality of samples of the analog signal during the initial portion of the sampling interval comprises analog-to-digital conversion circuitry to generate a plurality of digital samples of the analog signal during the sampling interval in respective limited-range analog-to-digital conversion operations such that a maximum possible value of each of the digital samples corresponds to a level of photocharge integration substantially below a maximum photocharge integration level of the photosensitive element.

14. The integrated-circuit image sensor of claim 13 further comprising accumulation circuitry to combine at least two or more of the digital samples to produce a digital pixel value representative of the photocharge integrated within the photosensitive element.

15. The integrated-circuit image sensor of claim 14 wherein the accumulation circuitry comprises circuitry to exclude at least one of the digital samples from contributing to the digital pixel value based, at least in part, on the value of the at least one of the digital samples relative to values of others of the digital samples.

16. The integrated-circuit image sensor of claim 13 wherein the analog-to-digital conversion circuitry to generate the plurality of digital samples in respective limited-range analog-to-digital conversion operations comprises ramp generation circuitry to iteratively generate a voltage ramp to be compared with the analog signal.

17. The integrated-circuit image sensor of claim 13 wherein the plurality of digital samples constitute an initial set of samples, and wherein the analog-to-digital conversion circuitry comprises circuitry to generate an additional digital sample of the analog signal during the sampling interval in an expanded-range analog-to-digital conversion operation capable of yielding a digital sample value greater than the maximum possible value of the digital samples of the initial set.

18. The integrated-circuit image sensor of claim 13 further comprising a second pixel having a photosensitive element and circuitry to output, throughout the sampling interval, an analog signal having an amplitude dependent, at least in part, on photocharge integrated within the photosensitive element of the second pixel, and wherein the analog-to-digital conversion circuitry comprises circuitry to generate, during the sampling interval, a digital sample of the analog signal output by the second pixel in an expanded-range analog-to-digital operation capable of yielding a digital sample value greater than the a maximum possible value of the digital samples of the analog signal output by the first pixel.

19. The integrated-circuit image sensor of claim 18 wherein the analog-to-digital conversion circuitry to generate the plurality of digital samples in the limited-range analog-to-digital conversion operations and to generate the digital sample in the expanded-range analog-to-digital conversion operation comprises voltage ramp circuitry to generate (i) a sequence of limited-range voltage ramps having a first maximum amplitude and (ii) an expanded-range voltage ramp that exceeds the first maximum amplitude.

20. A non-transitory machine-readable medium that stores data representative of an integrated-circuit image sensor comprising:
- a first pixel having a photosensitive element and circuitry to output, throughout a sampling interval, an analog signal having an amplitude dependent, at least in part, on photocharge integrated within the photosensitive element; and
- control circuitry to generate a plurality of samples of the analog signal during an initial portion of the sampling interval that is shorter than a settling time for a maximum possible level of the analog signal.

* * * * *